Figure 1:
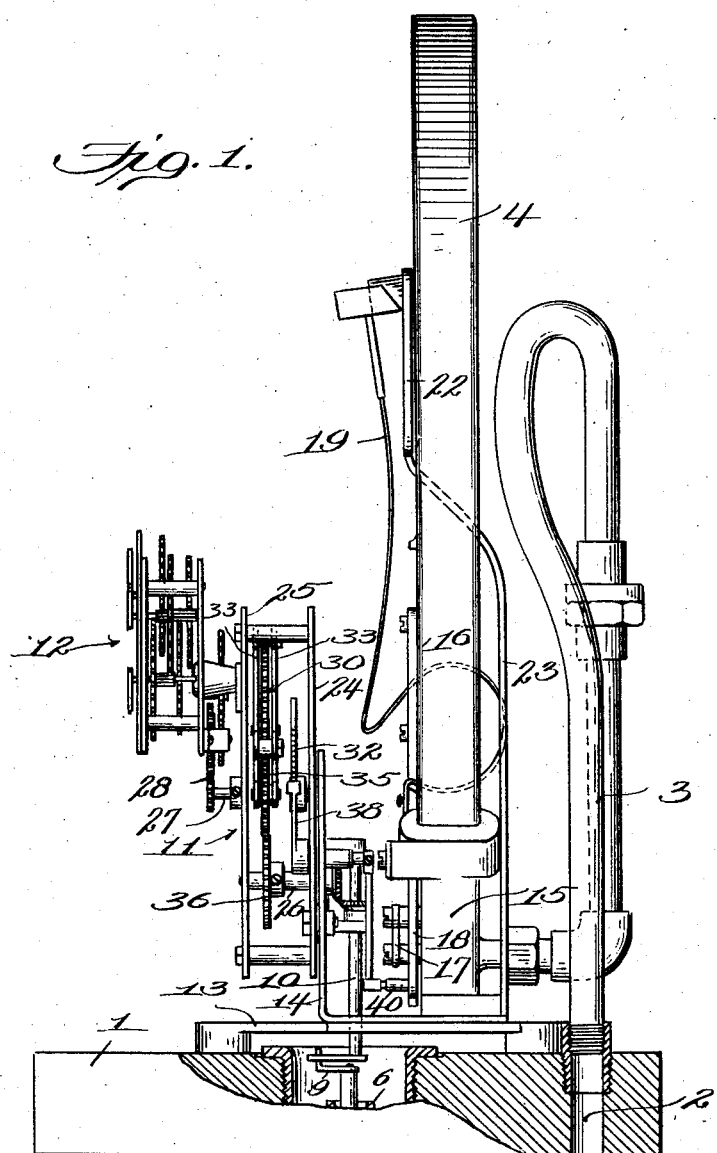

H. P. WESTCOTT.
ATTACHMENT FOR FLUID METERS.
APPLICATION FILED JAN. 31, 1912.

1,048,115.

Patented Dec. 24, 1912.
3 SHEETS—SHEET 1.

Witnesses:

Inventor
Henry P. Westcott
by

H. P. WESTCOTT.
ATTACHMENT FOR FLUID METERS.
APPLICATION FILED JAN. 31, 1912.
1,048,115.
Patented Dec. 24, 1912.
3 SHEETS—SHEET 2.
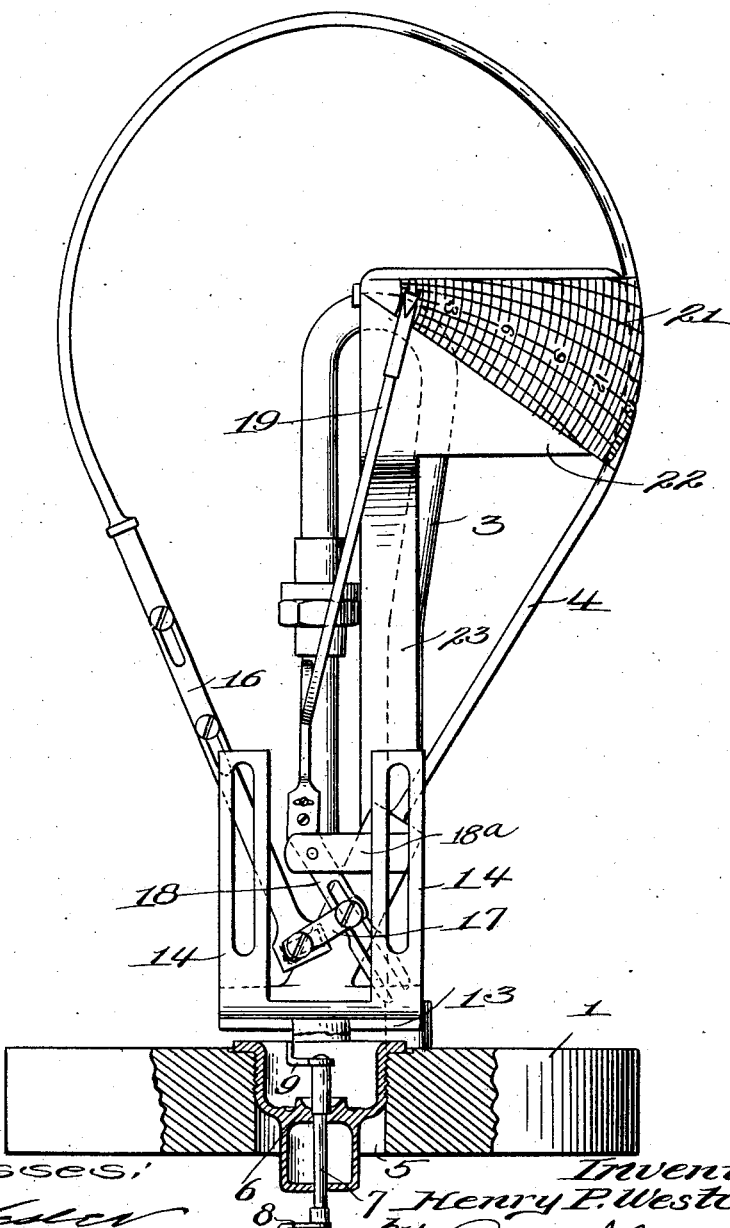

H. P. WESTCOTT.
ATTACHMENT FOR FLUID METERS.
APPLICATION FILED JAN. 31, 1912.
1,048,115.
Patented Dec. 24, 1912.
3 SHEETS—SHEET 3.
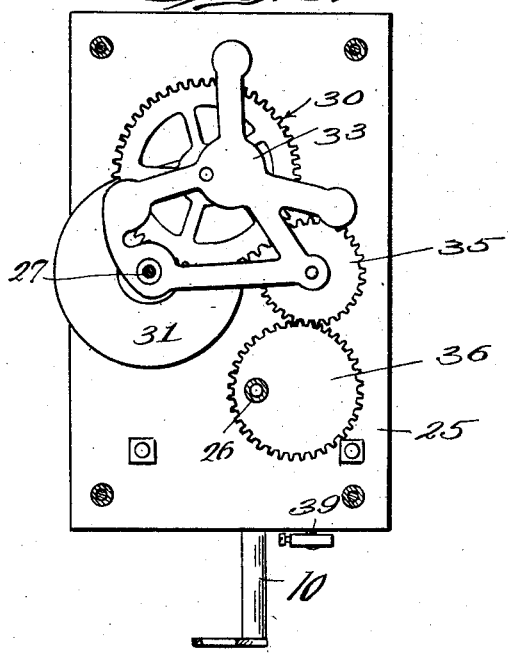
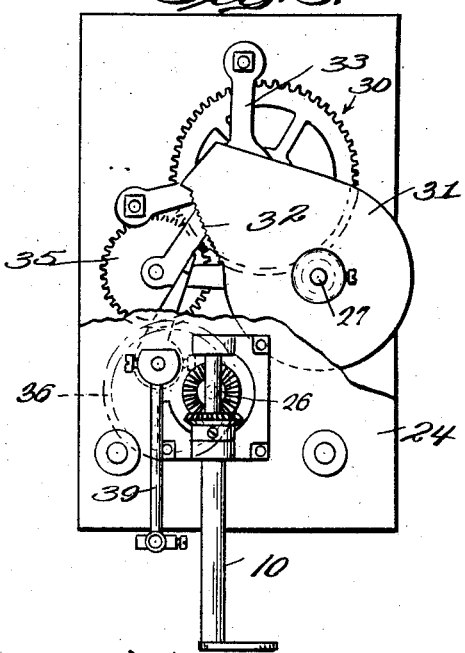
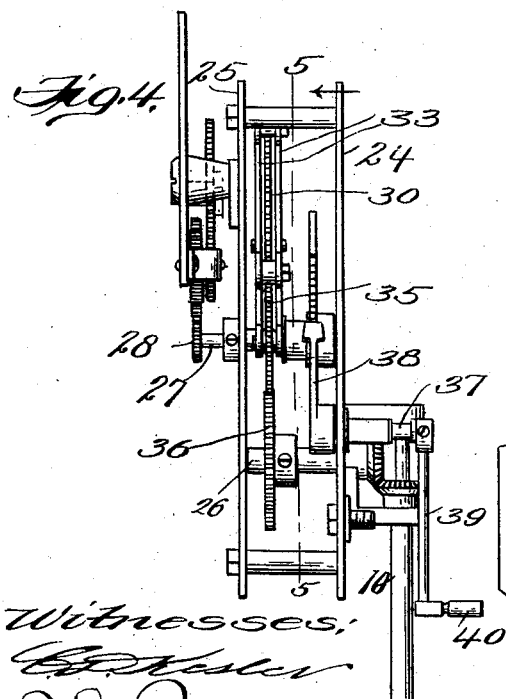
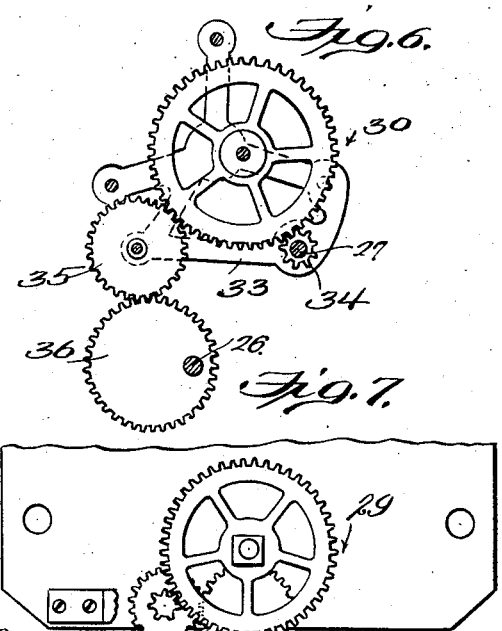

UNITED STATES PATENT OFFICE.

HENRY P. WESTCOTT, OF ERIE, PENNSYLVANIA.

ATTACHMENT FOR FLUID-METERS.

1,048,115.  Specification of Letters Patent.  Patented Dec. 24, 1912.

Application filed January 31, 1912. Serial No. 674,599.

*To all whom it may concern:*

Be it known that I, HENRY P. WESTCOTT, a citizen of the United States, residing at Erie, in the county of Erie and State of Pennsylvania, have invented new and useful Improvements in Attachments for Fluid-Meters, of which the following is a specification.

This invention relates to attachments for meters which are employed for measuring gas or other fluids wherein the quantity will vary substantially with the pressure.

The invention is disclosed in a form which is especially applicable for use in connection with proportional meters, but the invention is not limited in its practical application to proportional meters.

Broadly considered, the improvement relates to that class of attachments which are interposed between the meter spindle and the registering train, and which serve to complete the action of the latter in accordance with variations in pressure and to thereby eliminate the necessity of the clerical work involved in the use of "multipliers" for correcting the readings of the volume train in accordance with an integrated record of volume and pressure made ordinarily from separate readings produced by volume and pressure recorders.

With this understanding of the general nature of the invention, its object may be stated to be to provide in an attachment of the class identified a compensating mechanism which is very compact and which may be compactly and advantageously combined with its associated elements; which shall be extremely responsive and sensitive in its regulating action within the limits for which the meter and the attachment are calibrated; in which the parts are of such nature and arrangement as to provide for a compensating action with a very slight degree of friction, in which the parts are not subject to undue wear or to any disalinement which might destroy their accurate coordination; and in which the parts operate in a certain and reliable manner at all times and under all conditions.

The invention also comprehends a construction by virtue of which the action of the part which is sensitive to pressure, and is primarily instrumental in effecting the compensating operation, may be readily checked for the purpose of determining whether this part is accurate in its operation.

An embodiment of the invention is illustrated by way of example in the accompanying drawings, wherein:

Figure 1 is a view partly in side elevation, and partly in section, showing the attachment as an entirety; Fig. 2 is a view partly in front elevation and partly in section, showing the part which is susceptible to the pressure of the fluid passing through the meter and which is primarily instrumental in effecting the compensating action, such part in the instance disclosed being in the nature of a Bourdon tube, and being illustrated in connection with its immediate appurtenances; Fig. 3 is an elevation of the transmission train of the compensating device, taken from the rear thereof, with the rear wall or plate partially broken away to show the inclosed parts; Fig. 4 is a somewhat enlarged side elevation of the transmission train of the compensating device; Fig. 5 is a sectional view of the same on the line 5—5 of Fig. 4, looking in the direction of the arrow; Fig. 6 is a detail diagrammatic view of the compensating gearing forming a part of the compensating mechanism; and Fig. 7 is a detail view looking at the rear side of the registering device and showing the gearing by which the registering train is put into operative relation with the compensating mechanism.

Similar characters of reference designate corresponding parts throughout the several views.

As a matter of convenience, the parts of the attachment are suitably mounted upon a base 1, which is fitted to the meter, the said base and the parts which it directly or indirectly supports having a self-contained and unitary relation. The base 1 is provided with a duct 2 which communicates with the proportioning chamber (or the gas chamber of an ordinary meter), and to which is fitted a pipe 3 to conduct the gas to a pressure-sensitive actuating part 4, forming an element of the compensating mechanism and which is primarily instrumental in producing the compensating action to be hereafter explained. In the embodiment shown, the part 4 is in the nature of a Bourdon tube, such as is quite frequently employed in pressure gages or recorders. The part 1 also has a suitably located opening 5 in which is fitted a bearing 6. The bearing 6 furnishes support for a vertical shaft 7, having at its lower end a crank arm 8 and at its upper end a crank arm 9. The crank arm 8 connects with the meter spindle (not shown), having for this purpose a down-turned lug to engage through an opening in a crank arm provided at the adjacent end of said spindle. The crank arm 9 connects in like manner with a shaft 10, which actuates the transmission train of the compensating mechanism. The registering device is indicated generally by the numeral 12, and is of any desired construction suitable for employment in this connection.

For convenience of assemblage, a plate 13 is suitably secured to the upper face of the casting 1, and bridges the opening 5. The transmission train is secured to the vertical arm of an angle bracket 14 which is imposed upon the plate 13, and the registering device is secured to the front wall or plate of the framing which incloses the transmission train. The base portion 15 of the Bourdon tube 4 is placed over the horizontal arm of the angle bracket 14 and is bolted or otherwise secured to the plate 13. The Bourdon tube at its free end is provided with an adjustable extension 16, the lower end of which is connected by a link 17 to a lever 18, the latter being pivoted upon a suitable bracket 18ª which is conveniently provided upon the base portion of the Bourdon tube. The lower portion of the lever 18 is formed as a fork, and the link 17 is, at its end adjacent said lever, provided with a pin which is suitably secured in said fork in such manner as to allow the necessary movement of the parts. While the lever 18 is primarily designed for coöperation with the transmission train 11, it may also serve to actuate a pressure recording arm 19 which is joined to the upper end of said lever by a suitable connection, and which may be employed when it is desired to correct the action of the Bourdon tube or equivalent part. In such a case the arm 19 traverses a chart segment 21, which is suitably disposed upon a plate 22, provided at the upper end of an upright support 23. The indication thereby obtained during a given period of time may be compared with the indication obtained for the same period of time by a pressure recorder connected to the same line, and the action of the tube 4 or equivalent part may thus be checked from time to time in order to ascertain whether such tube or equivalent part is working accurately.

The parts constituting the transmission train are supported between front and rear plates 24 and 25, the rear plate 24 being adjustably secured to the vertical slotted arms of the bracket 14. The registering device 12 is suitably secured to the front plate 25. The transmission train includes two shafts 26 and 27. The shaft 26 is connected by miter gearing to the shaft 10 above referred to, which is supported in bearings carried by the rear plate 24. The shaft 27 projects beyond the front plate 25 and carries upon its front end a pinion 28 which is in gear with a train 29 supported externally and at the rear of the casing which incloses the registering train. The shaft 27 also carries between the plates 24 and 25 a gear train 30, and a plate 31, having a portion of its under face formed as a cam rack, as at 32. The elements of the gear train 30 are supported by a frame 33 which is freely oscillatory upon the shaft 27. Said gear train includes a pinion 34 which is fixed upon the shaft 27, and by which the action of the gear train 30 is transmitted to said shaft, the latter thereby in turn actuating the registering device through the connections described. The gear train 30 also includes a pinion 35 which is arranged at the free end of the frame 33 and to which the movement of the shaft 26 is directly transmitted, the pinion 35 for this purpose coacting with a pinion 36, which is eccentrically fixed upon the shaft 26. The rear plate 24 also furnishes support for a shaft 37, upon the forward end of which is mounted a stop pawl 38 for coöperation with the cam rack 32, and upon the rear end of which is mounted an arm 39 having at its lower end a pin 40 which engages in the slotted arm of the lever 18.

In operation, the action of the meter spindle is transmitted to the registering train through the intermediary of the shaft 10, the shaft 26, the pinion 36, the gear train 30, the shaft 27, and the gear train 29. The compensating action of the device affects the relative time of engagement of the pinions 35 and 36, and is produced by the coöperation of the pawl 38 and the cam rack 32. For instance, with the relatively low normal pressure referred to, it may be assumed that the pawl 38 is positioned at the innermost limit of the cam rack, whereby the gear train 30 may have its smallest degree of downward movement upon the shaft 27 as a center. In such a case, it may be explained that the pinions 35 and 36 are intermittently in mesh, it being understood that owing to the eccentric mounting of the pinion 36 and its engagement with the pinion 35, the gear train 30, while transmitting the action of the pinion 36 to the shaft 27, will rise and fall about said shaft as a center. If the pressure should increase above said relatively low normal degree, a corresponding distention of the Bourdon tube or its equivalent will take place, as is obvious; and in such a case, the free end of the Bourdon tube will move outwardly, thereby rocking the lever 18, the arm 39 connected to said lever, and the pawl 38 operated by said arm. When the free end portion of the Bourdon tube moves outwardly in this manner, the connections referred to will cause an outward movement of the pawl 38 to a corresponding point, so that said pawl will take a position in proper relation to the cam rack 32, and will, in accordance with its position, limit and lower the point to which the gear train 30, and consequently, the pinion 35, may descend upon the shaft 27 as a center, and thereby provide for an increase in the extent of the downward movement of said gear train 30. It will be obvious that the interval when the pinions 35 and 36 are not in engagement will be longer or shorter, in accordance with whether the pawl 38 is positioned farther from or nearer to the inner end of the cam rack 32. As the pressure increases, the pawl 38 will be moved farther from the inner end of the cam rack 32, and the action of the registering device will be correspondingly accelerated. Conversely, as the pressure decreases, said pawl will be moved nearer to the inner end of the cam rack 32 and the action of the registering device will be correspondingly retarded.

The teeth of the cam rack 32 are very fine, and an extreme delicacy of action is thus obtained, whereby the compensating device is very accurate and sensitive in its action. The lever 18, when actuated by the Bourdon tube or equivalent part to change the position of the pawl 38, is also instrumental in causing the arm 19 to traverse the chart or chart segment 21 and to thereby make a record of pressure variations which, as above stated, may be compared with the record taken from the same line and for the same period upon a pressure recording gage known to be in accurate working order. As above stated, the extension 16 of the tube 4 is adjustable whereby the "throw" of said tube may be increased or decreased, whenever necessary to secure accuracy.

Having fully described my invention, I claim:

1. The combination with a shaft driven by the spindle of a fluid meter, and a volume registering device having a driving train, of a compensating mechanism including a part which is variably distendable in accordance with pressure fluctuations and is subject to the pressure in the meter; a transmission train interposed between said shaft and said driving train; the transmission train comprising coacting elements adapted for intermittent operative engagement, one of the elements being driven by said shaft and the other element being actuated by said first-named element and in turn operating the driving train, one of said elements being mounted for movement in either direction toward and away from the other element and throughout the range of such movement, being engageable for a greater or less period in accordance with its position, with the other element; and means for regulating in accordance with pressure fluctuations, the degree of movement of the relatively movable element, the means having an element thereof operatively connected to said distendable part.

2. The combination with a shaft driven by the spindle of a fluid meter, and a volume registering device having a driving train, of a compensating mechanism including a part which is variably distendable in accordance with pressure fluctuations and is subject to the pressure in the meter; a transmission train interposed between said shaft and said driving train; the transmission train comprising coacting elements adapted for intermittent operative engagement, one of the elements being driven by said shaft and the other element being actuated by said first-named element and in turn operating the driving train, one of said elements being mounted for movement in either direction toward and away from the other element and throughout the range of such movement, being engageable for a greater or less period in accordance with its position, with the other element; and means for regulating, in accordance with pressure fluctuations, the degree of movement of the relatively movable element, the means comprising a stop pawl and a cam, the cam being movable with the relatively movable element and the stop pawl being operatively connected to the distendable part.

3. The combination with a shaft driven by the spindle of a fluid meter, and a volume registering device having a driving train, of a compensating mechanism including a part which is variably distendable in accordance with pressure fluctuations and is subject to the pressure in the meter; a transmission train interposed between said shaft and said driving train; the transmission train comprising an oscillatory gear system in constant relation with the driving train, and an eccentric gear wheel engaging a gear wheel of the oscillatory gear system and in constant relation with said shaft; and means for regulating the degree of oscillatory movement of said gear system and including an element which is operatively connected to said distendable part.

4. The combination with a shaft driven by the spindle of a fluid meter, and a volume registering device having a driving train, of a compensating mechanism including a part which is variably distendable in accordance with pressure fluctuations and is subject to the pressure in the meter; a transmission train interposed between said shaft and said driving train; the transmission train comprising an oscillatory gear system in constant relation with the driving train, and an eccentric gear wheel engaging a gear wheel of the oscillatory gear system and in constant relation with said shaft; and means for regulating the degree of oscillatory movement of said gear system and including a stop pawl and a cam constituting companion elements, one of the companion elements being associated with the oscillatory gear system and the other element being operatively connected to said distendable part.

5. The combination with a shaft driven by the spindle of a fluid meter, and a volume registering device having a driving train, of a compensating mechanism including a part which is variably distendable in accordance with pressure fluctuations and is subject to the pressure in the meter; a transmission train interposed between said shaft and said driving train; the transmission train comprising an oscillatory gear system including a shaft in constant relation to the driving train and a pinion fixed on the shaft and transmitting motion thereto, and an eccentric pinion engaging a pinion of the oscillatory gear system; a cam fixed on the shaft of the oscillatory gear system; and a pivoted stop pawl coacting with the cam and operatively connected to the distendable part.

6. The combination with a shaft driven by the spindle of a fluid meter, and a volume registering device having a driving train, of a compensating mechanism including a Bourbon tube; a transmission train interposed between said shaft and said driving train; the transmission train comprising an oscillatory gear system including a shaft in constant relation to the driving train and a pinion fixed on the shaft and transmitting motion thereto, and an eccentric pinion engaging a pinion of the oscillatory gear system; a cam fixed on the shaft of the oscillatory gear system; and a pivoted stop pawl coacting with the cam and operatively connected to the Bourdon tube, the connections comprising a forked lever jointed to the movable end of the Bourdon tube and an arm having the same pivot as the pawl and having a pin to engage in the fork of the lever.

7. The combination with a shaft driven by the spindle of a fluid meter, a volume registering device, and compensating gearing interposed between the shaft and the registering device, of a part which is variably distendable in accordance with pressure fluctuations and is subject to the pressure in the meter, a lever connected to the distendable part, a means of operative connection between the lever and the compensating gearing, a recording arm attached to the lever, and a chart traversable by the arm.

In testimony whereof I have hereunto set my hand in presence of two subscribing witnesses.

HENRY P. WESTCOTT.

Witnesses:
A. B. GALLYHER,
L. BEVINS.

---

Copies of this patent may be obtained for five cents each, by addressing the "Commissioner of Patents, Washington, D. C."